(12) United States Patent
Fleck et al.

(10) Patent No.: US 6,797,423 B2
(45) Date of Patent: Sep. 28, 2004

(54) HIGH-TEMPERATURE FUEL CELL

(75) Inventors: Robert Fleck, Adelsdorf (DE); Wolfram Kaiser, Bonndorf (DE)

(73) Assignee: Siemens Aktiengesellschaft, Munich (DE)

( * ) Notice: Subject to any disclaimer, the term of this patent is extended or adjusted under 35 U.S.C. 154(b) by 309 days.

(21) Appl. No.: 09/963,977

(22) Filed: Sep. 26, 2001

(65) Prior Publication Data

US 2002/0045083 A1 Apr. 18, 2002

Related U.S. Application Data

(63) Continuation of application No. PCT/DE00/00718, filed on Mar. 8, 2000.

(30) Foreign Application Priority Data

Mar. 26, 1999  (DE) .......................................... 199 13 959

(51) Int. Cl.[7] .............................................. H01M 8/02
(52) U.S. Cl. .............................. 429/34; 429/38; 429/39
(58) Field of Search ............................. 429/30, 34, 38, 429/35, 36, 37, 39

(56) References Cited

U.S. PATENT DOCUMENTS 5,733,682 A * 3/1998 Quadakkers et al. ........ 429/210

2001/0021470 A1 * 9/2001 May et al. .................... 429/44
2001/0049044 A1 * 12/2001 Molter ......................... 429/34

FOREIGN PATENT DOCUMENTS

| DE | 42 37 602 A 1 | | 5/1994 |
|---|---|---|---|
| DE | 196 49 457 C 1 | | 6/1998 |
| WO | 9723006 | * | 6/1997 |
| WO | PCT WO 97/35349 | | 9/1997 |
| WO | PCT WO 00/10214 | | 2/2000 |

OTHER PUBLICATIONS

A.J. Appleby et al.: "Fuel Cell Handbook", 1989, pp. 440–454.

F.D. Richardson et al.: J. Iron Steel Inst. 160, 261, 1948, p. 349.

* cited by examiner

Primary Examiner—Bruce F. Bell
Assistant Examiner—Monique Wills
(74) Attorney, Agent, or Firm—Laurence A. Greenberg; Werner H. Stemer; Ralph E. Locher

(57) ABSTRACT

In a high-temperature fuel cell, the problem exists that a series electrical resistance rises while the high-temperature fuel cell is operating. This rise is caused by oxidation of the fuel-gas-side surface of the bipolar plate. Oxidation of this nature is largely suppressed by an oxidation buffer that is disposed in the fuel gas chamber and takes up the oxygen.

6 Claims, 2 Drawing Sheets

HIGH-TEMPERATURE FUEL CELL

CROSS-REFERENCE TO RELATED APPLICATION

This application is a continuation of copending International Application No. PCT/DE00/00718, filed Mar. 8, 2000, which designated the United States.

BACKGROUND OF THE INVENTION

Field of the Invention

The invention relates to a high-temperature fuel cell with a fuel-gas chamber disposed between a bipolar plate and an anode of an electrolyte/electrode unit.

It is known that when water is electrolyzed the electrical current breaks down the water molecules to hydrogen ($H_2$) and oxygen ($O_2$) A fuel cell reverses this procedure. Electrochemical combination of hydrogen ($H_2$) and oxygen ($O_2$) to give water is a very effective generator of electric current. This occurs without any emission of pollutants or carbon dioxide if the fuel gas used is pure hydrogen ($H_2$). Even with an industrial fuel gas, such as natural gas or coal gas, and with air (which may also have been enriched with oxygen ($O_2$)) instead of pure oxygen ($O_2$), a fuel cell produces markedly lower levels of pollutants and less carbon dioxide than other energy generators in which the energy is introduced from different sources. The fuel cell principle has been implemented industrially in various ways, and indeed with various types of electrolyte and with operating temperatures of from 80° C. to 1000° C.

Depending on their operating temperature, fuel cells are divided into low-, medium-, and high-temperature fuel cells, and these in turn have a variety of technical configurations.

In the case of a high-temperature fuel cell stack composed of a large number of high-temperature fuel cells, there is an upper bipolar plate, which covers the high-temperature fuel cell stack, and under the plate there are, in order, at least one contact layer, an electrolyte/electrode unit, a further contact layer, a further bipolar plate, etc.

The electrolyte/electrode unit here contains two electrodes—an anode and a cathode—and a solid electrolyte configured as a membrane disposed between the anode and the cathode. Each electrolyte/electrode unit here situated between two adjacent bipolar plates forms, with the contact layers situated immediately adjacent to the electrolyte/electrode unit on both sides, a high-temperature fuel cell, which also includes those sides of each of the two bipolar plates which are situated on the contact layers. This type of fuel cell, and others types, are known from the reference titled "Fuel Cell Handbook" by A. J. Appleby and F. R. Foulkes, 1989, pp. 440–454, for example.

A single high-temperature fuel cell provides an operating voltage of less than one volt. A high-temperature fuel cell stack is composed of a large number of high-temperature fuel cells. The connection in series of a large number of adjacent high-temperature fuel cells can give an operating voltage of some hundreds of volts from a fuel-cell system. Since the current provided by a high-temperature fuel cell is high—up to 1,000 amperes in the case of large high-temperature fuel cells—the electrical connection between the individual cells should preferably be one that gives rise to particularly low series electrical resistance under the above-mentioned conditions.

The electrical connection between two high-temperature fuel cells is provided by a bipolar plate, via which the anode of one high-temperature fuel cell is connected to the cathode of the other high-temperature fuel cell. The bipolar plate therefore has an electrical connection to the anode of one high-temperature fuel cell and to the cathode of the other high-temperature fuel cell. The electrical connection between the anode and the bipolar plate is provided by an electrical conductor, which may take the form of a nickel grid (see, for example, German Patent DE 196 49 457 C1). It has been found that the series electrical resistance between the electrical conductor and the bipolar plate is high. This has a serious adverse effect on the electrical performance of the high-temperature fuel cell stack.

SUMMARY OF THE INVENTION

It is accordingly an object of the invention to provide a high-temperature fuel cell which overcomes the above-mentioned disadvantages of the prior art devices of this general type, which avoids any relatively high series electrical resistance even when used at high temperatures and to ensure a high conductivity even over prolonged periods.

With the foregoing and other objects in view there is provided, in accordance with the invention, a high-temperature fuel cell. The fuel cell contains a bipolar plate, an electrolyte/electrode unit having an anode, and a fuel-gas chamber formed between the bipolar plate and the anode. An oxidation buffer containing iron is disposed in the fuel-gas chamber.

The object is achieved by a high-temperature fuel cell of the type described in the introduction in which, according to the invention, the oxidation buffer is disposed in the fuel-gas chamber.

Experiments using a high-temperature fuel cell stack have shown that the electrical resistance between the electrical conductor and a bipolar plate formed Cr5Fe1$Y_2O_3$ rises, even after a short operating time at normal operating temperatures of between 850° C. and 950° C. The designation Cr5Fe1$Y_2O_3$ represents a chromium alloy that contains 5% by weight of Fe and 1% by weight of $Y_2O_3$. The increase in the electrical resistance is caused by an oxide layer which contains chromium oxide and even after a short operating period forms on the surface of that side of the bipolar plate which faces that chamber of the high-temperature fuel cell which carries fuel gas, known as the fuel-gas chamber for short. It also forms where the electrical conductor, for example the nickel grid, rests on the bipolar plate or is connected to the bipolar plate, for example by a weld spot or a soldering point. If the electrical conductor, for example the nickel grid, is spot-welded to the bipolar plate, during operation the oxide, amazingly, even migrates under these contact points, which are in the form of weld spots. Chromium oxide has higher electrical resistance than the unoxidized metals of the bipolar plate. Therefore, there is an oxide layer of poor conductivity between the electrical conductor and the bipolar plate, and this has an adverse effect on the series resistance of series-connected high-temperature fuel cells. The formation of chromium oxide takes place even at oxygen partial pressures of less than $10^{-18}$ bar. These oxygen partial pressures are generally also present in the fuel-gas chamber while the high-temperature fuel cell is operating.

The invention is based on the idea that a relatively high series electrical resistance is avoided and a high conductivity is ensured even over relatively long periods if the formation of the oxide layer on the bipolar plate is suppressed. This is achieved by the fact that the oxygen that is situated in the fuel-gas chamber of the high-temperature fuel cell while the latter is operating is taken up and stored by the oxidation buffer. Consequently, oxygen is withdrawn from the fuel gas and is then no longer available for oxidation of the bipolar plate. For this purpose, the oxidation buffer is configured in such a way that it takes up oxygen from the environment.

The term oxidation buffer is understood as meaning a device that takes up oxygen from the fuel gas during a with-load phase operation of the high-temperature fuel cell and releases the oxygen again during an idling phase of operation. In this way, the oxidation buffer is regenerated for a further with-load operating phase. The term with-load operation refers to the operating mode of the high-temperature fuel cell in which the high-temperature fuel cell generates significant amounts of electric current by the electrochemical combination of fuel gas and oxygen. The electrochemical combination does not take place during an idling mode. The idling mode is introduced, for example, by disconnecting the high-temperature fuel cells from a consumer.

In this context, an oxygen storage that takes up oxygen but cannot be regenerated again while the high-temperature fuel cell is operating is not considered to be an oxidation buffer. The property of being capable of regeneration, i.e. the possibility of removing the stored oxygen from the oxidation buffer again while the high-temperature fuel cell is operating represents a basic requirement of the oxidation buffer.

The appropriate material selected for the oxidation buffer is determined by the temperature and the oxygen partial pressure at which the high-temperature fuel cell is operated in the load phase and in the idling phase. A suitable material for the oxidation buffer is a material that during with-load operation is oxidized and during idling mode is reduced at the operating temperatures of the high-temperature fuel cell. The data required to select the material can be taken from tables. An example that can be mentioned in this context is the article by F. D. Richardson and J. H. E. Jeffes in J. Iron Steel Inst. 160, 261 (1948).

The invention ensures that the oxidation of the bipolar plate is suppressed as far as possible. This prevents a relatively high series electrical resistance of the high-temperature fuel cell and ensures a high conductivity even over prolonged periods.

The oxidation buffer expediently contains metallic iron, cobalt or nickel or an oxide of these metals. Iron or iron oxide is a particularly suitable material for the oxidation buffer at an operating temperature of around 900° C. The oxygen partial pressure in the fuel-gas chamber during with-load operation is usually around $10^{-15}$ bar and in the idling mode is usually around $10^{-19}$ bar. Iron is a material that takes up oxygen at the above temperatures and oxygen partial pressures of around $10^{-15}$ bar and releases it at oxygen partial pressures of around $10^{-19}$ bar. Therefore, iron is a particularly suitable material for the oxidation buffer in these operating ranges.

At a lower operating temperature of a high-temperature fuel cell, for example around 850° C., Co is recommended. Ni is suitable at around 800° C. Further metals result from other operating temperatures.

An oxidation buffer that contains, for example, iron or iron oxide takes up oxygen from the fuel-gas chamber while the high-temperature fuel cell is operating with load and stores it by oxidation of the metallic iron. Regeneration of the oxidation buffer, i.e. reduction of the iron oxide, takes place during the idling phase of the high-temperature fuel cell, during which the oxygen partial pressure falls to around $10^{-19}$ bar. During regeneration of the oxidation buffer, the oxygen which has until then been bound in the iron oxide is liberated again and enters the fuel-gas chamber of the high-temperature fuel cell. So that in this phase there is little or no oxidation of the bipolar plate taking place, it is expedient to reduce the temperature of the high-temperature fuel cell during the regeneration phase, for example to around 850° C. or below. Furthermore, it is appropriate to accelerate the regeneration of the oxidation buffer as far as possible by reducing the oxygen partial pressure. In an advantageous configuration of the invention, the oxidation buffer has a porous surface. A high porosity of the surface results in the oxidation buffer having a large surface area. The larger the surface area, the more oxygen can be taken up by oxidation per unit time by the oxidation buffer or can be released by reduction. A large surface area of the oxidation buffer can be achieved particularly effectively by configuring the oxidation buffer as a sponge.

In a further configuration of the invention, the oxidation buffer is configured as a foil. A foil, which may, for example, be laid as a layer onto a component of the high-temperature fuel cell, does not impair or scarcely impairs the flow of the fuel gas through the fuel-gas chamber. Furthermore, a foil is simple and inexpensive to produce.

In an advantageous configuration of the invention, the oxidation buffer is applied to the bipolar plate as a layer. This layer may be in the form of platelets that are attached to the bipolar plate, for example by welding. The layer may also be applied to the bipolar plate by electrode position, by thermal spraying or by a physical vapor deposition (PVD) process, such as sputtering, electron-beam vaporization or laser-beam vaporization. In this configuration of the invention, the layer is oxidized on the side that is remote from the bipolar plate while the high-temperature fuel cell is operating with load.

When using iron or iron oxide as the oxidation buffer, operation of the high-temperature fuel cell is switched over to the idling mode before the oxygen can reach the bipolar plate, i.e. before the layer is completely oxidized. As a result, the iron oxide of the oxidation buffer, which is formed during operation with load, is reduced to form metallic iron and the layer is regenerated.

The electrical connection between the anode and the bipolar plate of a high-temperature fuel cell is usually produced by a wire netting (see for example German Patent DE 196 49 457 C1).

In a preferred embodiment of the invention, a wire netting of this type in the fuel-gas chamber simultaneously serves as the oxidation buffer. This embodiment of the invention results in that there is no need to introduce an additional component into the fuel-gas chamber of the high-temperature fuel cell. It is appropriate for the wire netting to be configured as the oxidation buffer in such a way that the oxidation buffer is not situated in the immediate vicinity of the bipolar plate. Consequently, during regeneration of the oxidation buffer the oxygen that is released from the oxidation buffer is prevented as far as possible from passing into the bipolar plate.

In a further advantageous configuration of the invention, the bipolar plate is formed of $Cr5Fe1Y_2O_3$, i.e. contains 94% by weight of chromium, 5% by weight of Fe and 1% by weight of $Y_2O_3$. A bipolar plate of this type has proven to be suitable for operation in a high-temperature fuel cell in numerous tests.

Other features which are considered as characteristic for the invention are set forth in the appended claims.

Although the invention is illustrated and described herein as embodied in a high-temperature fuel cell, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
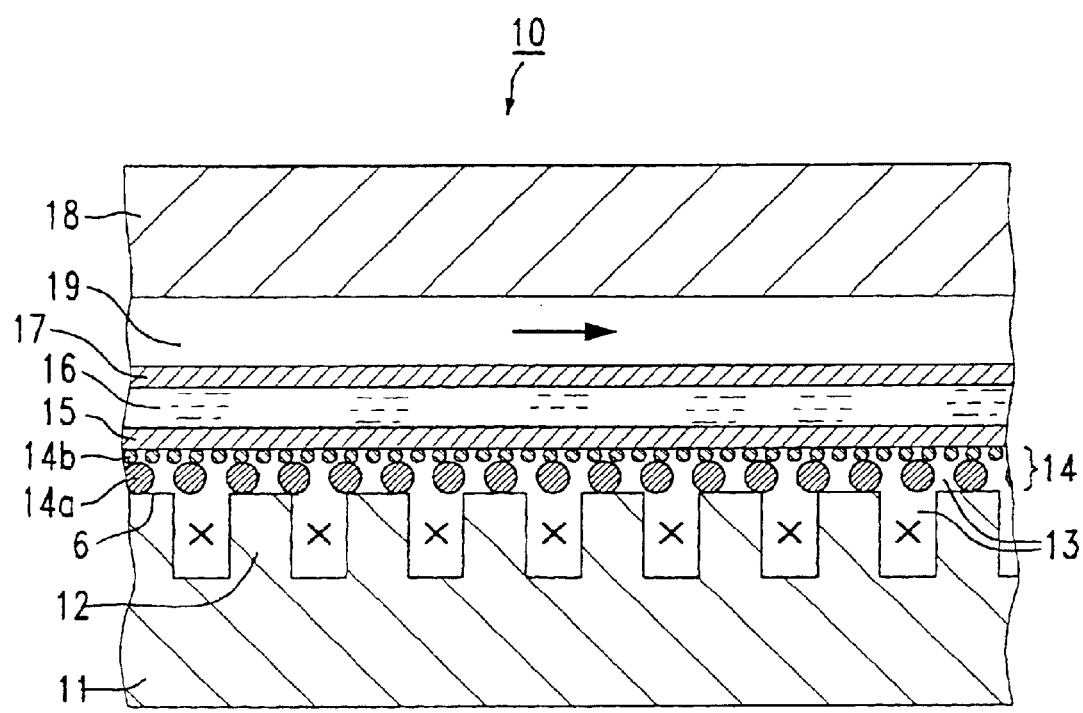
FIG. 1 is a diagrammatic, fragmentary sectional view of a high-temperature fuel cell in which an oxidation buffer is disposed in a fuel-gas chamber in a form of an iron netting according to the invention.

Referring now to the figures of the drawing in detail and first, particularly, to FIG. 1 thereof, there is shown a bipolar plate 11 made from $C5Fe1Y_2O_3$ of a high-temperature fuel cell 10. The bipolar plate 11 is provided with a number of webs 12, between which have been formed channels running perpendicularly to the plane of the paper for an operating media. The channels are fed with fuel gas, such as hydrogen, natural gas or methane. Together with further chambers, they form a fuel-gas chamber 13. A wire netting 14 is spot-welded to the bipolar plate 11. The weld spots are not shown or the sake of clarity. The wire netting 14 is electrically and mechanically connected to the bipolar plate 11 via the weld spots. The wire netting 14 is in this case a grid assembly, containing a coarse, thicker support grid 14a and a fine, thinner contact grid 14b. The support grid 14a is nickel grid, and the contact grid 14b is an iron grid.

A solid electrolyte 16 adjoins the wire netting 14 via a thin anode 15. The solid electrolyte 16 is delimited at the top by a cathode 17. A unit containing the cathode 17, the solid electrolyte 16 and the anode 15 is referred to as an electrolyte/electrode unit. While the high-temperature fuel cell 10 is operating with a load, a fuel gas flows through the fuel-gas chamber 13 between the bipolar plate 11 and the anode 15. A further bipolar plate 18, only part of which is shown at the top, adjoins the cathode 17 via a non-illustrated contact layer. A number of channels 19 for operating media, only one of which is shown, are machined in the bipolar plate 18. The channels 19 for the operating media run parallel to the plane of the paper and, while the high-temperature fuel cell 10 is operating, carry oxygen or air.

The contact grid 14b made from iron in the fuel-gas chamber 13 of the high-temperature fuel cell 10 serves as an oxidation buffer. While the high-temperature fuel cell 10 is operating with load, the iron takes up oxygen from the fuel-gas chamber 13 and stores it by oxidation. Regeneration of the oxidation buffer, i.e. reduction of the iron oxide, takes place during an idling phase of the high-temperature fuel cell 10. The oxidation buffer reduces the oxygen partial pressure in the fuel-gas chamber 13 of the high-temperature fuel cell 10 to such an extent that the oxidation of the bipolar plate 11 is suppressed or only proceeds to an insignificant extent. This avoids a relatively high series electrical resistance of the high-temperature fuel cell 10 and ensures a high conductivity even over prolonged periods.

Figure 2:
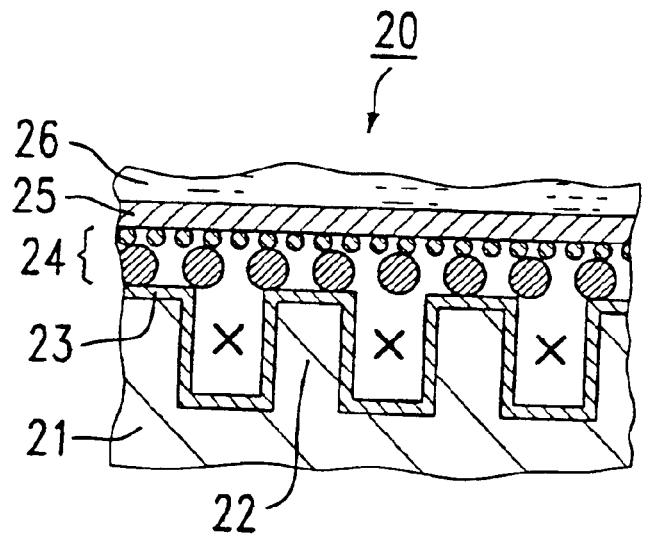
FIG. 2 is a fragmentary sectional view of part of the high-temperature fuel cell in which the oxidation buffer is disposed in the fuel-gas chamber in the form of a foil.

FIG. 2 shows part of a high-temperature fuel cell 20 in which a bipolar plate 21 is provided with a number of webs 22, between which channels for an operating media are formed, running perpendicular to the plane of the paper. The bipolar plate 21 is covered with a foil 23 of iron, which serves as the oxidation buffer. A wire netting 24 is applied to the foil 23. A solid electrolyte 26 adjoins the wire netting 24 via a thin anode 25. While the high-temperature fuel cell 20 is operating with a load, the metallic iron of the foil 23 takes up oxygen from the fuel-gas chamber through oxidation. Regeneration of the iron serving as the oxidation buffer is carried out before the foil 23 has been oxidized to such an extent that the oxygen progresses the bipolar plate 21.

Figure 3:
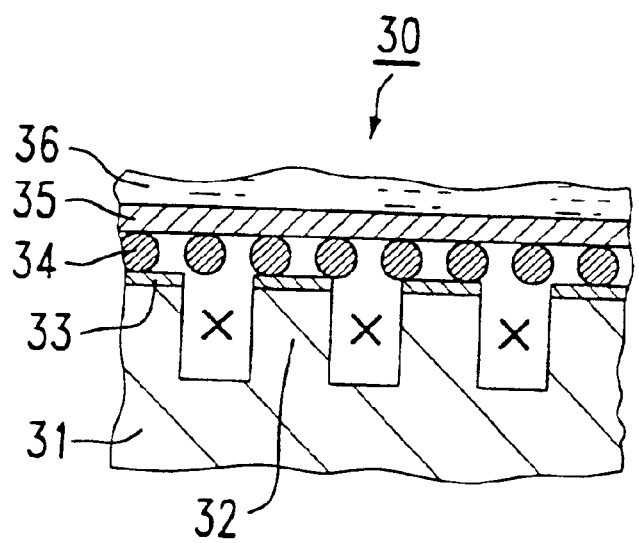
FIG. 3 is a fragmentary sectional view of a part of the high-temperature fuel cell in which the oxidation buffer is disposed in the fuel-gas chamber in the form of iron platelets.

FIG. 3 shows a bipolar plate 31 of a high-temperature fuel cell 30 with platelets 33 of iron. The platelets 33 have been applied to webs 32 of the bipolar plate 31. The bipolar plate 31 is electrically connected to an anode 35 of the electrolyte/electrode unit of the high-temperature fuel cell 30 by a wire netting 34. The anode 35 and a solid electrolyte 36, but not the cathode, of the electrolyte/electrode unit are shown. The platelets 33 of iron act as a protective layer on the bipolar plate 31, preventing oxidation of the bipolar plate 31 at those locations at which the oxidation would lead to an increase in the series resistance of the high-temperature fuel cell 30.

We claim:

1. A high-temperature fuel cell, comprising:
   a bipolar plate;
   an electrolyte/electrode unit having an anode;
   a fuel-gas chamber formed between said bipolar plate and said anode; and
   an oxidation buffer containing iron and being disposed in said fuel-gas chamber permitting fuel-gas to pass between said oxidation buffer and said bipolar plate.

2. The high-temperature fuel cell according to claim 1, wherein said oxidation buffer has a porous surface.

3. The high-temperature fuel cell according to claim 1, wherein said oxidation buffer is a foil.

4. The high-temperature fuel cell according to claim 1, wherein said oxidation buffer is applied to said bipolar plate as a layer.

5. The high-temperature fuel cell according to claim 1, including a wire netting disposed in said fuel-gas chamber, and said oxidation buffer forms part of said wire netting.

6. The high-temperature fuel cell according to claim 1, wherein said bipolar plate is formed of $Cr5Fe1Y_2O_3$.

* * * * *